Aug. 29, 1933.  C. R. HUBBARD  1,924,555
MACHINERY PACKING
Filed Sept. 18, 1931

Inventor
Cecil R. Hubbard,
By his Attorneys,
Fraser, Myers & Manley.

Patented Aug. 29, 1933

1,924,555

UNITED STATES PATENT OFFICE 1,924,555

MACHINERY PACKING

Cecil R. Hubbard, Palmyra, N. Y., assignor to The Garlock Packing Company, Palmyra, N. Y., a corporation of New York Application September 18, 1931
Serial No. 563,529

5 Claims. (Cl. 288—1)

This invention relates to improvements in machinery packing of a type adapted for general use either as a means of sealing the joint about a rotating or reciprocating rod against fluid presure of any character, or as a means of preventing the escape of a lubricant, or for service as a combined presure seal and lubricant seal.

An object of the invention is to provide a sealing element of a flexible and semi-resilient character and to provide said sealing element with a more highly resilient spreader or expanding element normally tending to maintain the sealing element extended to dimensions slightly greater than those relied upon to effect the seal.

In the accompanying drawing illustrating preferred forms of the invention:—

Referring first to Figs. 1, 2 and 3, 20 represents one form of sealing element adapted for use in making packing embodying the invention herein disclosed. This sealing element may be constructed of materials which may vary in accordance with the conditions to be met in service. It may, for example, consist of folds of asbestos or other fibrous material saturated and impregnated with rubber composition and vulcanized.

Figure 1:
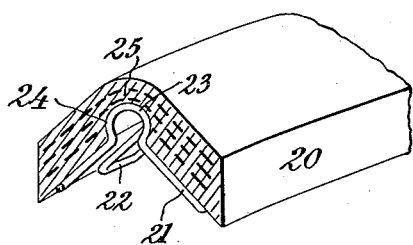
Figure 1 is a view, partly in perspective and partly in cross-section, of a finished packing constructed in accordance with the above-described invention.
Figure 2:
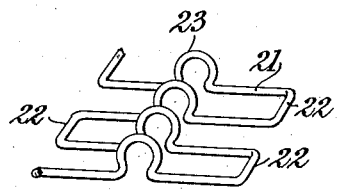
Fig. 2 is a perspective view of a fragment of the expanding element detached from the sealing element.

The resilient expanding or spreading element of the packing as illustrated in Fig. 2 may comprise resilient metal in strip form to be extended along the sealing element and having flexed portions lying along opposite sides of the center line which tend to spread or open out the sealing element. The preferred form of expanding element may comprise a zigzag strip of wire 21, of any suitable cross-sectional form, of which the alternate loops 22 may be united along the center line by arc-like connecting elements 23. In the form of packing selected for illustration in Fig. 1, the sealing element 20 is V-shaped in cross-section and is provided with an undercut groove 24 along its concave surface, thus providing a relatively thin wall 25 along the apex of the V so as to produce a zone of weakness along the center of the packing adapted to serve as a relatively flexible hinge-like joint between the portions at opposite sides of the center line.

Figure 3:
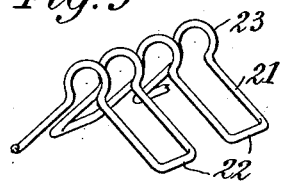
Fig. 3 is a perspective view of the expanding element illustrated in Fig. 2 flexed to the shape which it assumes when united with the sealing element to form the finished packing of Fig. 1.

In assembling the sealing element and the expanding element to produce the finished packing illustrated in Fig. 1, the expanding element is flexed from the shape illustrated in Fig. 2 to the shape illustrated in Fig. 3, and the arc-like connecting elements 23 are thrust into the undercut slot 24 of the sealing element, after which the loops 22 at opposite sides of the connecting elements will engage portions of the concave surface of the sealing element and tend to open or spread it out until the resilience of the sealing element and the resilience of the expanding element are balanced.

It is not essential that the expanding element be made of the exact form illustrated in Fig. 2 with the loops at opposite sides lying in the same plane. All that is required is that the normal form of the sealing element and the normal form of the expanding element be such that, when the two are assembled, the combined structure will assume a normal form somewhat more spread out or flattened than is necessary to produce the effective width of packing relied upon to effect a seal. When the packing element is put into a stuffing-box or other housing in which it is to be used, it will be flexed by bending the elements about the center line so that the tendency of the expanding element to resume its normal form will maintain the sealing lips of the packing tightly compressed against the opposed surfaces and form an effective seal.

It will be obvious that the packing need not necessarily be symmetrical with respect to the center line, but that the principle of the invention might be applied to any packing requiring one portion to be flexibly connected with another and to have a resilient expanding element adapted to open up or bend one of the elements designed to serve as a sealing lip to a position slightly beyond that which it is intended to assume when in use.

Figure 4:
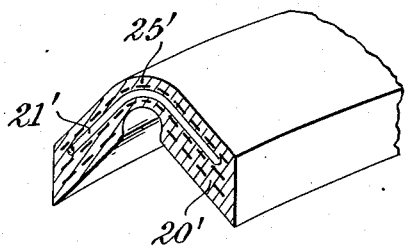
Fig. 4 is a view, partly in perspective and partly in cross-section, of a short length of a finished packing having the invention embodied therein in modified form.
Figure 5:
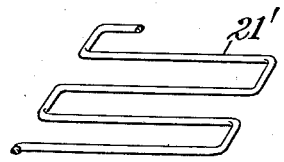
Fig. 5 is a perspective view of a fragment of the expanding element used in the construction of the packing illustrated in Fig. 4.
Figure 6:
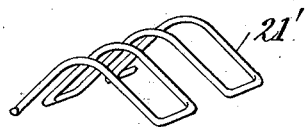
Fig. 6 is a perspective view of the short length of expanding element illustrated in Fig. 5 flexed to the position in which it is held when embedded in a sealing element to form the finished packing illustrated in Fig. 4.

In Fig. 4 is illustrated a modified form of the invention in which the expanding element 21' is embedded within the material of the sealing element 20'. The expanding element may, as illustrated in Fig. 5, comprise a zigzag strip of resilient metal 21'. In making the packing illustrated in Fig. 4, the expanding element 21' may be flexed to the form illustrated in Fig. 6 and embedded in the material from which the sealing element is made before it is vulcanized. The green sealing element, with the expanding element embedded therein, may be vulcanized or cured in a mold of such form as to hold the packing with its margins bent more closely together than they are intended to be in the finished structure. After the removal of the finished packing from the mold, the expanding element will cause the product to be opened out or flattened until the resilience of the expanding element and the counter-resilience of the sealing element are balanced with the packing of a somewhat greater effective width than that relied upon to effect a seal when in use. As in the case of the packing illustrated in Fig. 1, the packing illustrated in Fig. 4 will be flexed about the line of weakness 25' when it is inserted in a stuffing-box, as a result of which the tendency of the expanding element to again open or flatten it to its normal form will maintain the sealing surfaces in close contact with the surfaces to be packed.

Figure 7:
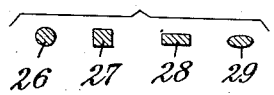
Fig. 7 is a diagrammatic view representing in cross-section various shapes of material adapted for use in making the expanding element of the form illustrated in either Fig. 2 or Fig. 5.

The cross-sectional form of the expanding element as illustrated in Fig. 7 may be circular as shown at 26, or square as shown at 27, or rectangular as shown at 28, or elliptical as shown at 29, or of any other desired form.

The invention is not intended to be limited to the specific forms herein selected for purposes of illustration, but should be regarded as covering modifications and variations thereof within the scope of the appended claims.

What is claimed is:—

1. A machinery packing comprising a strip of flexible, fluid-sealing material of V-shaped form in cross-section having an undercut groove along the center of its concave side, in combination with an expanding element comprising resilient strip material including elements held in mutual interlocking engagement with the walls of the undercut groove in the sealing element and elements held against the inner walls of the sealing element at opposite sides of the groove and tending to flatten the structure by bending it along the relatively thin wall of material at the base of the groove.

2. A machinery packing comprising a strip of flexible, fluid-sealing material of V-shaped form in cross-section having an undercut groove along the center of its concave side, in combination with a resilient, zigzag, expanding element comprising loops disposed in alternation along the concave surface of the sealing element at opposite sides of the center line and arc-like connecting portions, each exceeding a semicircle in extent, held in mutual interlocking engagement with the walls of the undercut groove in the sealing element, the unrestrained form of the expanding element being such as to tend to flatten the sealing element by bending it along the relatively thin wall of material at the base of the groove.

3. A machinery packing comprising a strip of flexible, non-metallic packing material divided into two relatively movable portions by an undercut groove so disposed as to produce a zone of weakness adapted to serve as a resilient hinge-like joint, the two portions being united at the joint at an angle to form a trough-like structure and at least one of said portions having a marginal surface adapted to serve as a fluid-sealing area, and an attached expanding means in the form of flexible, resilient metal extending along said packing element and having hump-like portions held in a mutual interlocking engagement with the walls of the undercut groove and portions disposed at opposite sides of said joint, the normal, unrestrained form of the expanding means being such as to cause it to tend to bend the sealing element about the hinge-like joint to a position beyond that relied upon to effect a seal when in use as a packing.

4. A machinery packing comprising a strip of flexible, non-metallic packing material divided into two relatively movable portions by an undercut groove so disposed as to produce a zone of weakness adapted to serve as a resilient hinge-like joint, the two portions being united at the joint at an angle to form a trough-like structure and at least one of said portions having a marginal surface adapted to serve as a fluid-sealing area, and an attached expanding element comprising a zigzag strip having loops disposed in alternation along the surface of the packing element at opposite sides of the zone of weakness and arc-like connecting portions, each exceeding a semicircle in extent, held in mutual interlocking engagement with the walls of the undercut groove, the normal, unrestrained form of the expanding element being such as to cause it to tend to bend the sealing element about the hinge-like joint to a position beyond that relied upon to effect a seal when in use as a packing.

5. An expanding agent for use as an element of a machinery packing comprising a zigzag strip of resilient material having the loops at the opposite sides of the structure united by intermediate arc-like portions each exceeding a semicircle in extent.

CECIL R. HUBBARD.